United States Patent
Farkas et al.

(10) Patent No.: US 6,439,866 B1
(45) Date of Patent: Aug. 27, 2002

(54) DOWNHOLE ROTARY MOTOR WITH SEALED THRUST BEARING ASSEMBLY

(75) Inventors: Robert J. Farkas, Blanchard; Bryan F. McKinley; Andrew M. Ferguson, both of Oklahoma City, all of OK (US)

(73) Assignee: Cudd Pressure Control, Inc., Houma, LA (US)

( * ) Notice: Subject to any disclaimer, the term of this patent is extended or adjusted under 35 U.S.C. 154(b) by 0 days.

(21) Appl. No.: 09/541,294

(22) Filed: Apr. 3, 2000

(51) Int. Cl.⁷ .................................. F03C 2/08
(52) U.S. Cl. .................. 418/48; 418/104; 175/107
(58) Field of Search .................. 418/48, 104; 175/107

(56) References Cited

U.S. PATENT DOCUMENTS

| | | | | |
|---|---|---|---|---|
| 2,991,837 A | * | 7/1961 | Postlewaite | 175/107 |
| 4,019,591 A | * | 4/1977 | Fox | 175/107 |
| 4,226,428 A | | 10/1980 | Paptzun | 277/94 |
| 4,268,040 A | | 5/1981 | Bainard et al. | 277/1 |
| 4,270,759 A | | 6/1981 | Denton et al. | 277/1 |
| 4,402,653 A | | 9/1983 | Maruyama et al. | 418/76 |
| 4,410,284 A | | 10/1983 | Herrick | 384/93 |
| 4,518,049 A | * | 5/1985 | Baldenko et al. | 418/48 |
| 4,560,014 A | * | 12/1985 | Geczy | 175/107 |
| 4,596,475 A | | 6/1986 | Pannwitz | 384/147 |
| 4,610,319 A | | 9/1986 | Kalsi | 175/107 |
| 4,650,430 A | | 3/1987 | Schiek | 440/88 |
| 4,842,286 A | | 6/1989 | Heilala | 277/38 |
| 4,917,639 A | | 4/1990 | Onoue | 384/620 |
| 5,037,212 A | | 8/1991 | Justman et al. | 384/907.1 |
| 5,143,385 A | | 9/1992 | Sponagel et al. | 277/134 |
| 5,230,520 A | | 7/1993 | Dietle et al. | 277/134 |
| 5,299,814 A | | 4/1994 | Salpaka | 279/157 |
| 5,301,637 A | | 4/1994 | Blount | 123/45 A |
| 5,368,398 A | | 11/1994 | Damm et al. | 384/304 |
| 5,388,843 A | | 2/1995 | Sedy | 277/96.1 |
| 5,441,283 A | | 8/1995 | Pecht et al. | 277/96.1 |
| 5,492,341 A | | 2/1996 | Pecht et al. | 277/96.1 |
| 5,501,470 A | | 3/1996 | Fuse et al. | 277/96.1 |
| 5,509,737 A | | 4/1996 | Waskiewicz et al. | 384/138 |
| 5,660,520 A | | 8/1997 | Scarsdale | 415/104 |
| 5,664,787 A | | 9/1997 | Fuse et al. | 277/96.1 |
| 5,678,829 A | | 10/1997 | Kalsi et al. | 277/134 |
| 5,683,184 A | | 11/1997 | Striedacher et al. | 384/138 |
| 5,702,110 A | | 12/1997 | Sedy | 277/96.1 |
| 5,738,356 A | | 4/1998 | Marshall | 277/27 |
| 5,938,349 A | | 8/1999 | Ogawa | 384/615 |
| 5,967,674 A | | 10/1999 | Rebeult et al. | 384/620 |

* cited by examiner

*Primary Examiner*—John J. Vrablik
(74) *Attorney, Agent, or Firm*—Mary M. Lee

(57) ABSTRACT

A rotary device, such as a downhole motor, with a rotary wave seal assembly. The seal assembly is formed by a sinuous or non-linear circumferential gland or groove and an annular seal member, such as an O-ring, supported in the groove. The device further includes at least one thrust bearing assembly for transmitting axial pressure from the bearing housing to the drive shaft. Each thrust bearing comprises a self-lubricating thrust washer as the bearing element. Still further, where the rotary device comprises two coaxial tubular structures that are not to rotate relative to each other, an anti-rotation means is provided. The anti-rotation means includes a cylindrical pin received in mating longitudinal, radiused grooves in the outer wall of the innermost elongate member and the inner wall of the outermost tubular member. The anti-rotation means includes a cylindrical pin received in the mating longitudinal grooves. This configuration allows axial, sliding movement of one tubular member relative to the other, but prevents rotational movement therebetween. Where the rotary device is a downhole motor, it further comprises a radial bearing sleeve positioned between the coaxial downhole ends of the universal housing and the connecting rod, above the bearing section of the motor. This sleeve acts as a barrier to prevent debris in the drilling fluid from moving into the bearing assemblies.

29 Claims, 8 Drawing Sheets

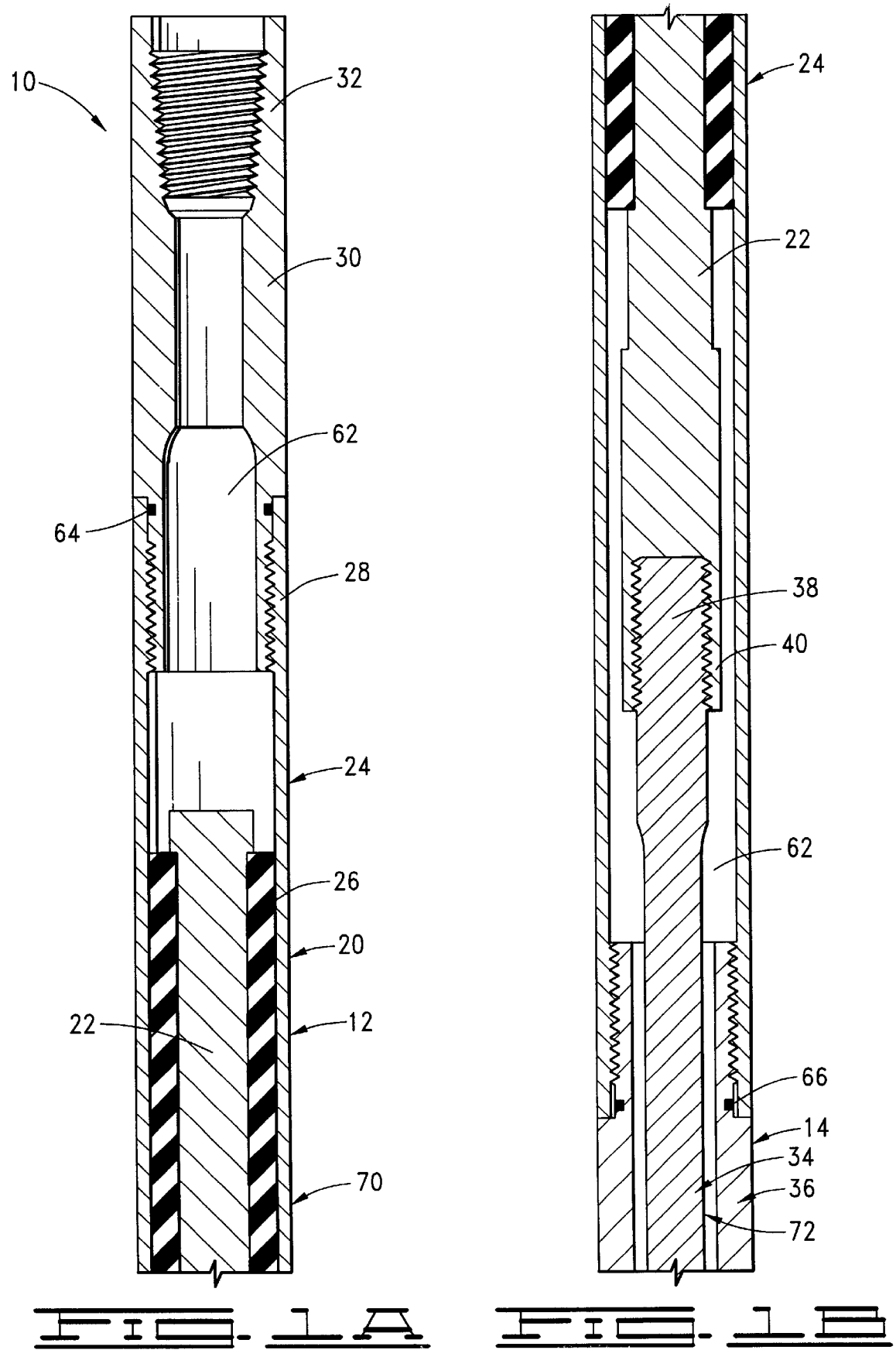

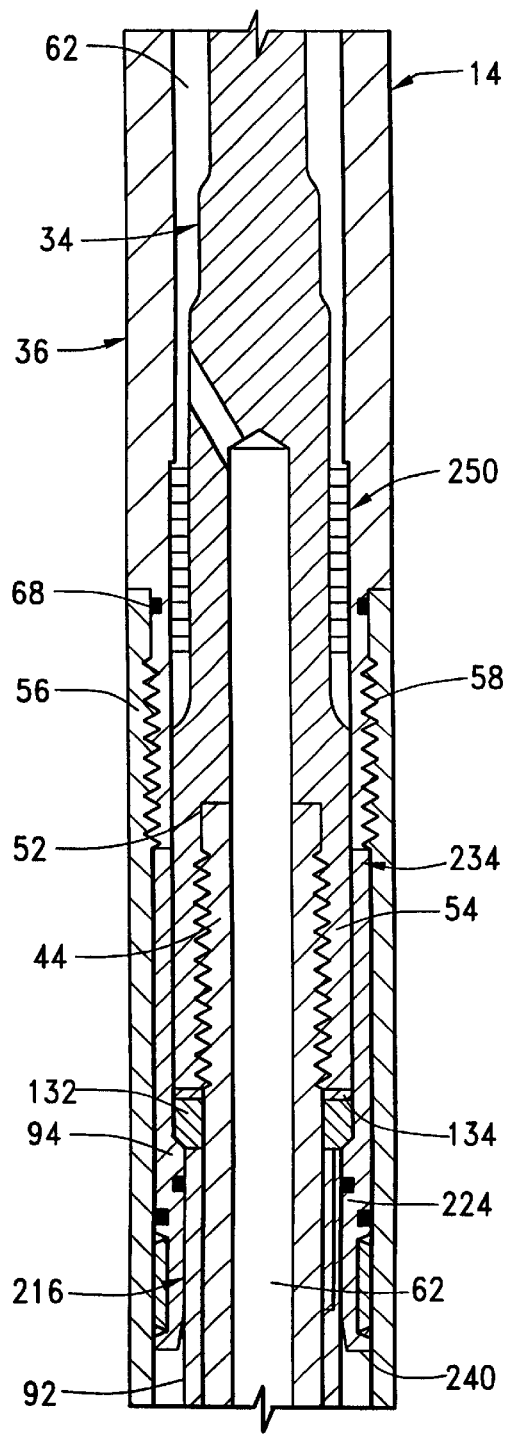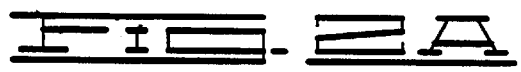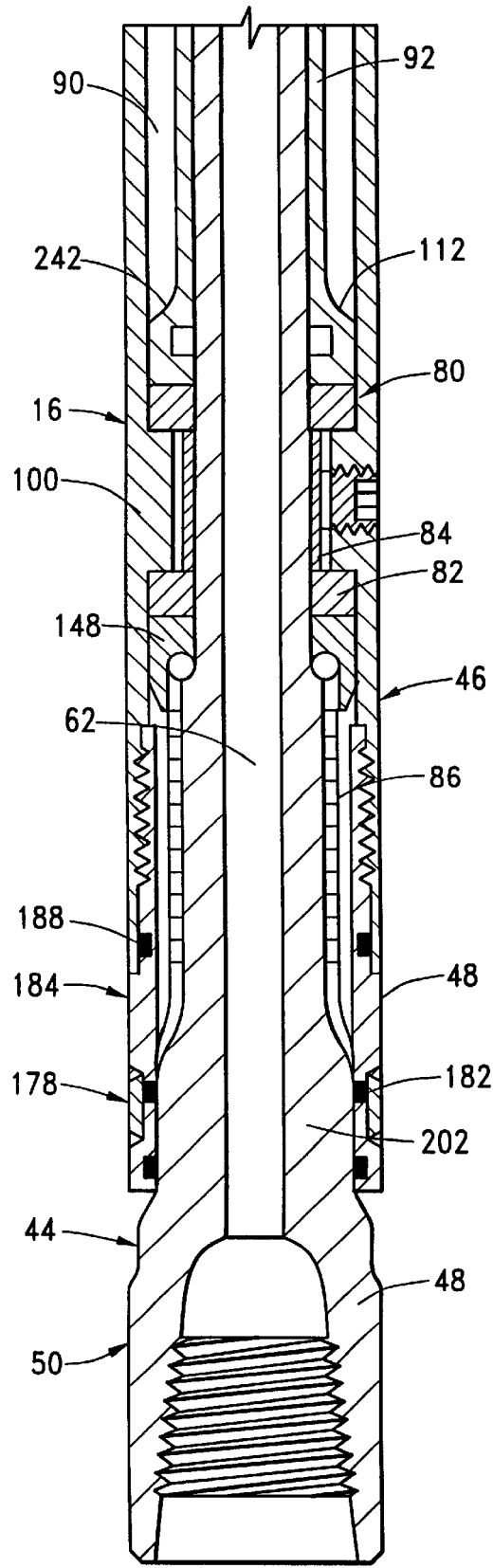

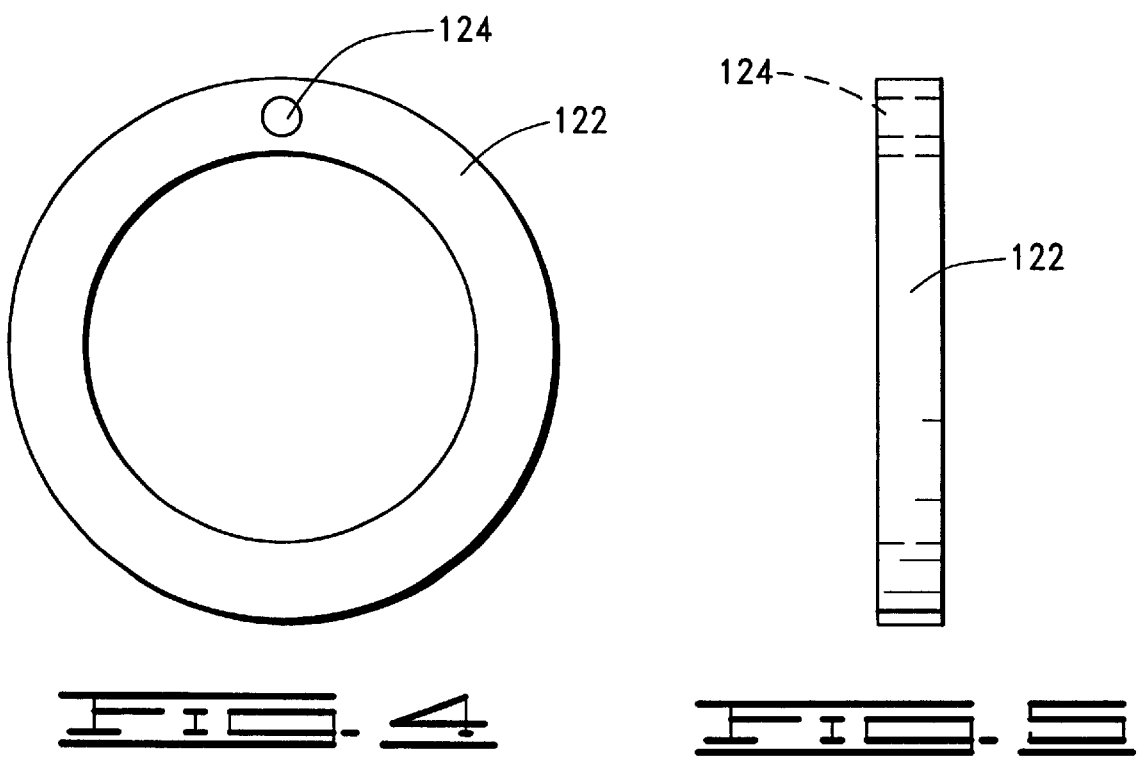
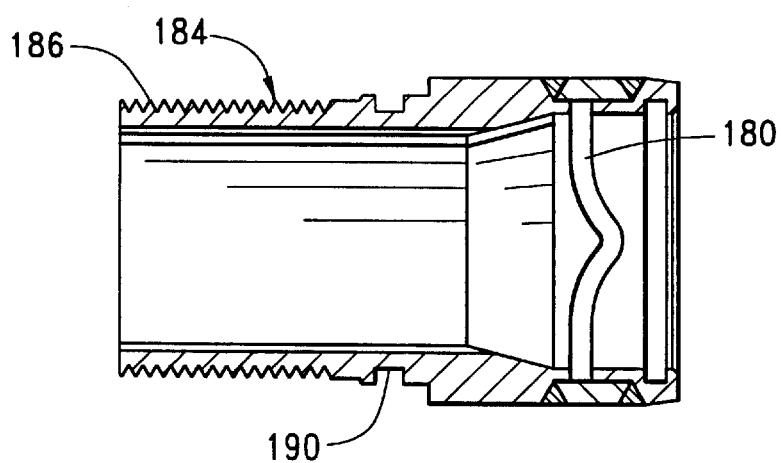

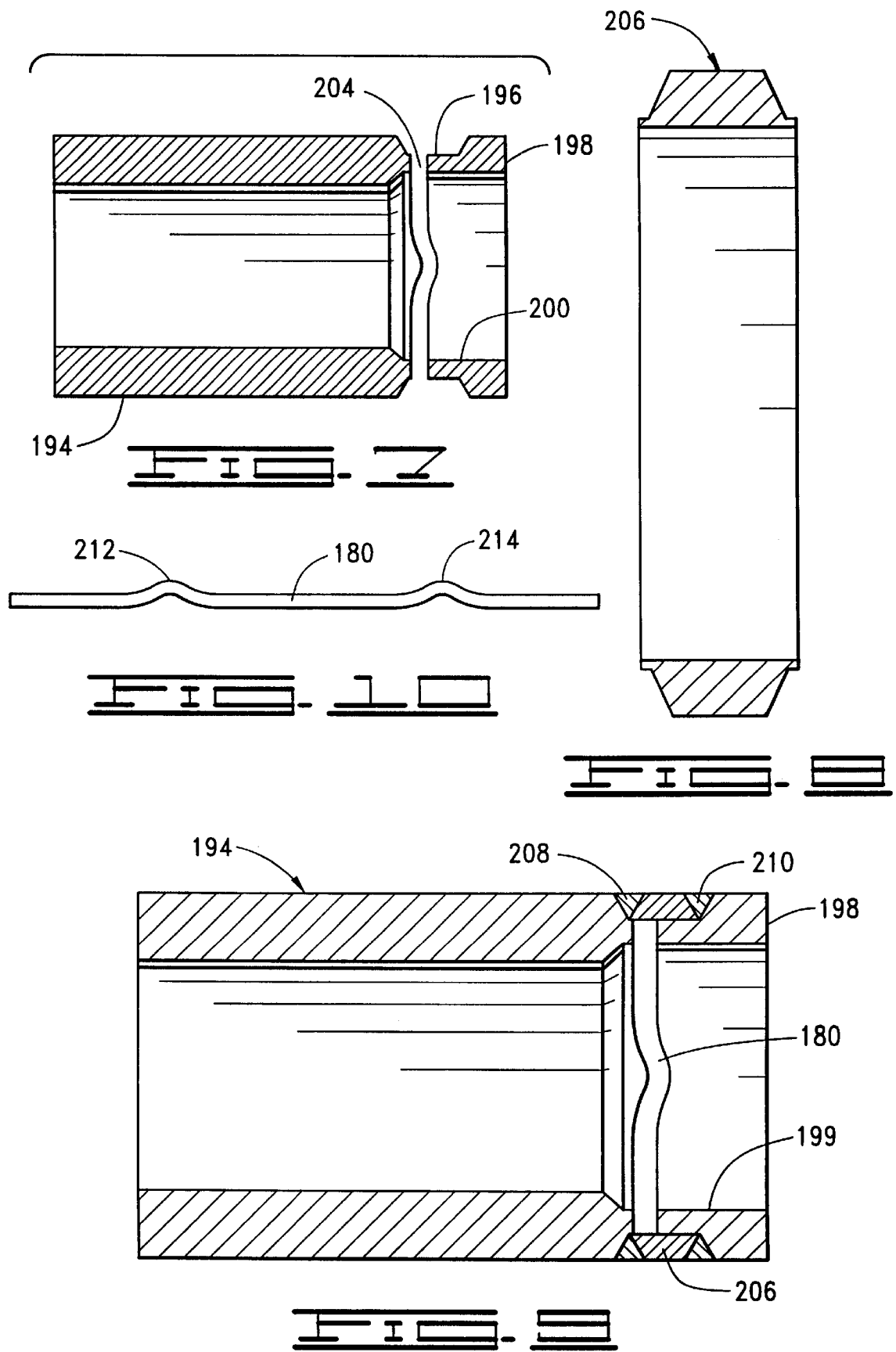

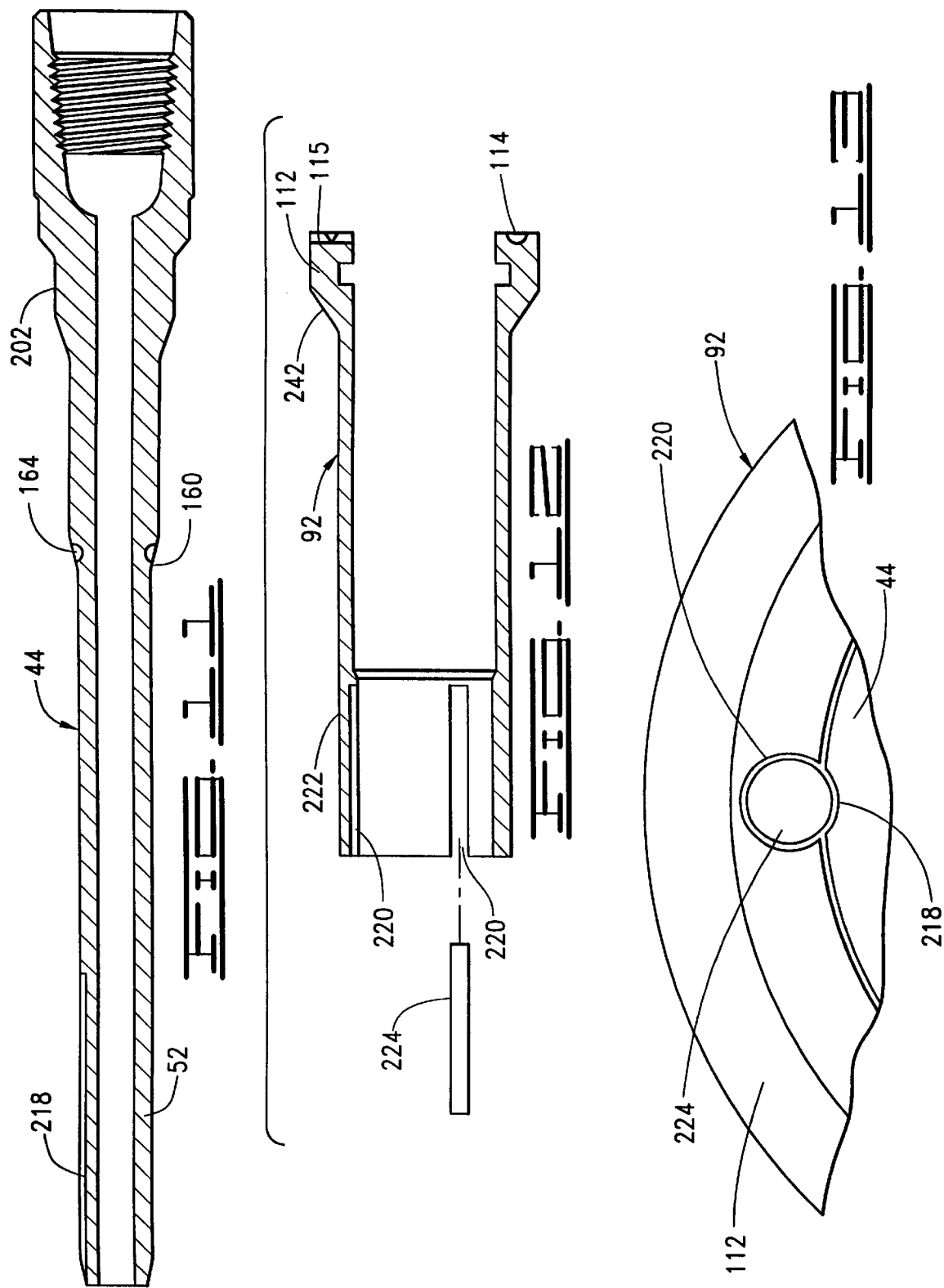

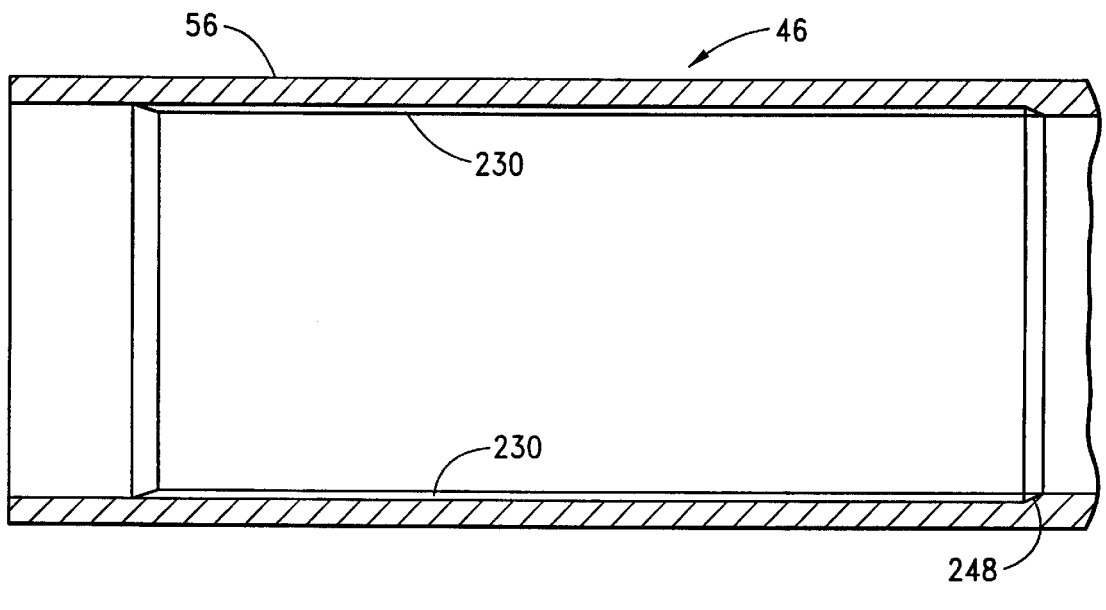
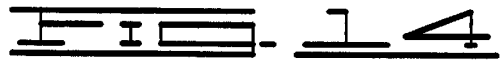
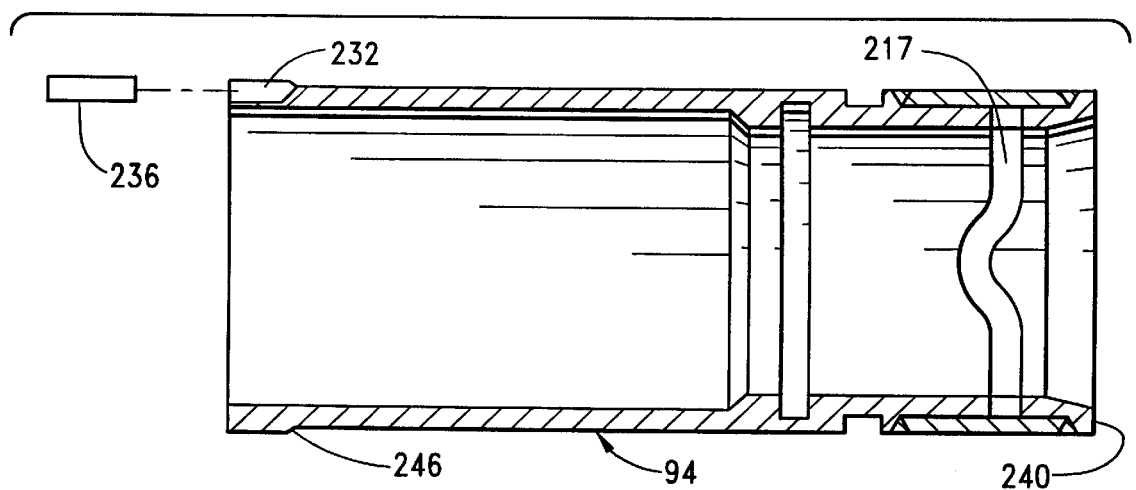
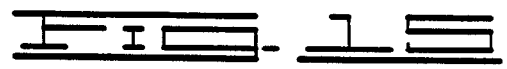

DOWNHOLE ROTARY MOTOR WITH SEALED THRUST BEARING ASSEMBLY

FIELD OF THE INVENTION

The present invention relates generally to rotary devices such as downhole motors.

BACKGROUND OF THE INVENTION

Rotary devices, such as downhole motors, often must support both thrust and torque forces. Consequently, rotary devices typically are provided with both thrust bearings and radial bearings. These bearing assemblies, especially the thrust bearings, are subject to much wear. Lubrication for such bearing systems has increased the working life of the bearings, but there remains a need for a thrust bearing for a downhole motor that does not require lubrication to maintain function.

Entry of debris into a thrust bearing will greatly accelerate failure of the bearing members. Thus, various seals have been developed to enclose the bearing assemblies in downhole motors and other rotary devices. Yet, there continues to be a need for rotary seals that are more effective and less expensive.

In some downhole motors, as well as other rotary devices, there are multiple coaxial tubular components. Often, two adjacent tubular members are designed either to rotate together or not to rotate at all relative to the other tubular members. There is a need for a means for locking adjacent tubular members together for simultaneous rotation or to prevent rotation of one of the members. Other devices have been used for this purpose. However, a need persists for a locking device that permits axial movement but prevents rotational movement between the tubular members, and yet minimizes the stress concentrations.

In downhole motors, debris from the drilling fluid can also enter the bearing section and cause problems. Accordingly, there is a need for a debris barrier between the upper section of the motor assembly and the lower bearing section.

The rotary device of the present invention addresses these needs and offers other advantages that will be come apparent from the following description.

SUMMARY OF THE INVENTION

The present invention is directed to a rotary device comprising an outer tubular assembly comprising a first outer tubular member and an inner assembly comprising a first inner elongate member coaxially received in the first outer tubular member. One of the first inner elongate member and the first outer tubular member rotates relative to the other. The rotary device further includes a rotary seal assembly comprising an annular flexible seal member received in a circumferential sinuous groove formed in either the outer surface of the first inner elongate member or the inner surface of the first outer tubular member.

The present invention further comprises a rotary device having an outer tubular assembly comprising a first outer tubular member, wherein a longitudinal groove is provided on the inner wall of the first outer tubular member. Also included is an inner assembly comprising a first inner elongate member coaxially received in the first outer tubular member. One of the first inner elongate member and the first outer tubular member rotates relative to the other. An intermediate tubular member is coaxially positioned between the first outer tubular member and the first inner elongate member. A longitudinal groove is provided on the outer wall of the intermediate tubular member. An elongate cylindrical pin is receivable in the longitudinal groove of the intermediate tubular member and the longitudinal groove of the first outer tubular member when the respective grooves are aligned, whereby rotation of the intermediate tubular member relative to the first outer tubular member is prevented and whereby axial movement of the intermediate tubular member relative to the first outer tubular member is permitted.

Still further, the present invention includes a rotary device with an outer tubular assembly comprising a first outer tubular member and an inner assembly comprising a first inner elongate member coaxially received in the first outer tubular member. A longitudinal groove is provided on the outer wall of the first outer tubular member. One of the first inner elongate member and the first outer tubular member rotates relative to the other. An intermediate tubular member is coaxially positioned between the first outer tubular member and the first inner elongate member, and a longitudinal groove is provided on the inner wall of the intermediate tubular member. An elongate cylindrical pin is receivable in the longitudinal groove of the intermediate tubular member and the longitudinal groove of the first inner elongate member when the respective grooves are aligned, whereby rotation of the intermediate tubular member relative to the first inner elongate member is prevented and whereby axial movement of the intermediate tubular member relative to the first inner elongate member is permitted.

In yet another aspect, the present invention is directed to a downhole motor. The downhole motor includes a motor section, a connecting section and a bearing section. The motor section comprises a tubular outer assembly and a motor supported in the tubular outer assembly for creating torque. The bearing section comprises a bearing housing and a drive shaft supported for rotation within the bearing housing and operatively connected to the motor. A thrust bearing assembly is included in the bearing section. The thrust bearing assembly is adapted to transmit axial pressure between the bearing housing and the drive shaft and comprises a self-lubricating thrust washer.

Still further, the present invention is directed to another embodiment of a downhole motor. In this embodiment, the motor comprises a motor section, a connecting section and a bearing section. The motor section includes a tubular outer assembly and a motor supported in the tubular outer assembly for creating torque. The bearing section comprises a bearing housing and a drive shaft supported for rotation within the bearing housing. Also included in the bearing section is at least one thrust bearing assembly for transmitting axial pressure between the bearing housing and the drive shaft. The connecting sec tion has a connecting rod for transmitting torque from the motor to the drive shaft and a universal housing for supporting the connecting rod. In addition, the motor section, the bearing section and connecting section form a continuous fluid pathway for drilling fluid. An anti-friction sleeve is positioned coaxially between the connecting rod and the universal housing whereby debris in the drilling fluid is prevented from entering the bearing section.

BRIEF DESCRIPTION OF THE DRAWINGS

FIGS. 1A–1D show a longitudinal, sectional view of a downhole motor in accordance with the present invention.

FIGS. 2A–2B show an enlarged, fragmented, longitudinal sectional view of the bearing section of the motor shown in FIG. 1A–1D.

FIG. 4 is a plan view of the thrust washer used in the thrust bearing assemblies.

FIG. 5 is a side elevational view of the thrust washer of FIG. 4.

FIG. 6 is a section view of the endcap of the bearing housing.

FIGS. 7–10 illustrate the preferred method for fabricating the endcap including the sinuous seal groove.

FIG. 11 is a section view of the drive shaft.

FIG. 12 is an exploded, section view of the piston sleeve and anti-locking pin.

FIG. 13 is a fragmented, enlarged end view of the assembled drive shaft and piston sleeve with the anti-locking pin in place.

FIG. 14 is a fragmented, sectional view of the bearing housing.

FIG. 15 is an exploded, sectional view of the piston and anti-locking pin.

DETAILED DESCRIPTION OF THE PREFERRED EMBODIMENT

Figure 1C:
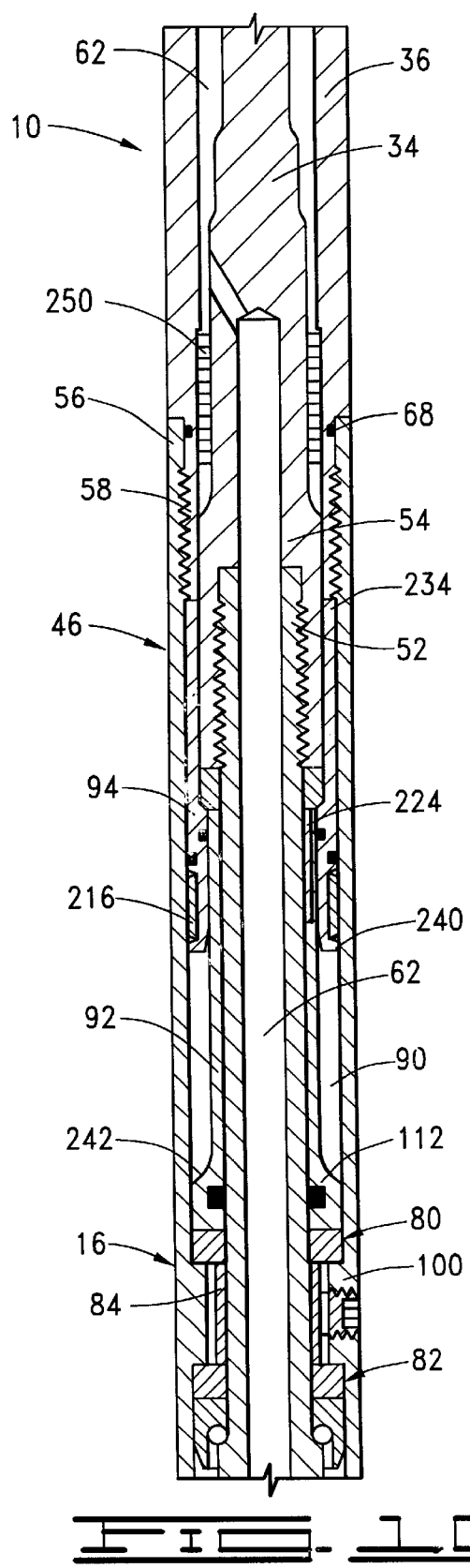
Figure 1D:
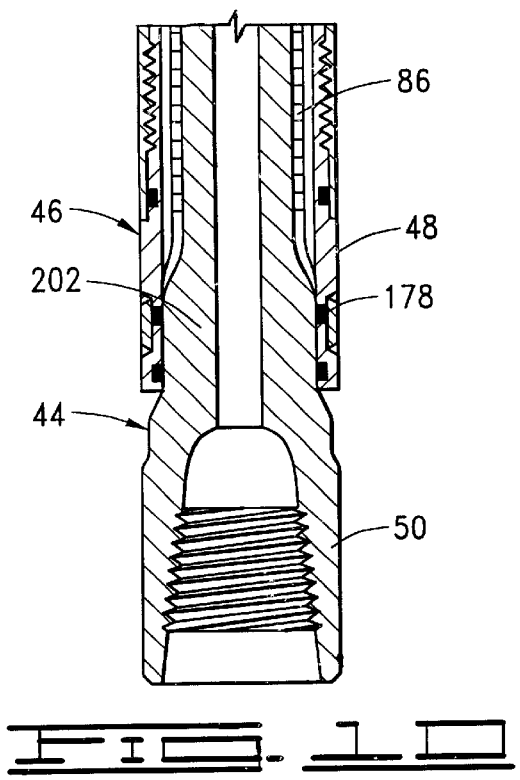

The present invention is directed to a rotary device. As used herein, "rotary device" refers to any device comprising an out tubular member and an inner elongate member (a tube or a solid rod) coaxially supported in the outer member and wherein either the inner or outer member rotates relative to the other. The invention will be described in the context of a downhole motor in which an inner drive shaft is supported for rotation inside an outer tubular housing. However, as will become apparent, a downhole motor is merely illustrative of a wide range of rotary devices to which the present invention may be applied.

With reference now to the drawings in general and to FIG. 1A–1D particular there is shown therein a rotary device and more specifically a downhole motor constructed in accordance with present invention and designated generally by the reference numeral 10. The motor 10 generally comprises a motor section 12, a connecting section 14, and a bearing section 16.

The motor section 12 comprises a torque-creating motor. In most instances, the motor will be a Moineau type positive displacement motor 20 as shown in the drawings herein. This type of motor 20 typically is composed of an inner elongate member, such as the rotor 22, supported within an outer tubular member or stator 24 having a rubber lining 26. However, other types of positive displacement motors may be used. The upper end 28 of the stator 24 is threadedly connected to a top sub 30, which is in turn connected by the threaded box end 32 to the drill string or coiled tubing (not shown).

The connecting section 14 preferably comprises an inner elongate member such as a connecting rod 34 supported in an outer tubular member such as the universal housing 36. The upper end 38 of the connecting rod 34 is drivingly connected to the downhole end 40 of the rotor 22, as by a threaded connection.

The bearing section 16 comprises an inner elongate member such as a drive shaft 44 supported in an outer tubular member such as the bearing housing 46. The downhole end of the drive shaft 44 preferably extends a distance beyond the downhole end 48 of the bearing housing 46 and may provided with a threaded box end 50 to connect to a drill bit (not shown) or other tool or device. The upper end 52 of the drive shaft 44 is drivingly connected to the downhole end 54 of the connecting rod 34 as by a threaded joint. The upper end 56 of the bearing housing 46 is threadedly connected to the downhole end 58 of the universal housing 36.

In a manner well known in the art, the motor section 12, the connecting section 14 and the bearing section 16 form a continuous fluid pathway 62 for transmitting drilling fluid or "mud" through the motor 10. To provide a fluid seal, the various joints may be provided with O-rings 64, 66 and 68 or other seal assemblies.

Now it will be seen that in this embodiment of the present invention the outer tubular members, the top sub 30, the stator 24, the universal housing 36 and the bearing housing 46 form an outer tubular assembly 70. In addition, the inner elongate members, the rotor 22, the connecting rod 34 and the drive shaft 44 form an inner elongate assembly 72. As indicated, in this embodiment, the inner elongate assembly 72 is designed to rotate within the outer tubular assembly 70. However, it should be understood that in other rotary devices according to this invention, an outer tubular assembly may rotate around a stationary inner elongate assembly.

The bearing section 16 is shown in more detail in FIG. 2A–2B, to which attention now is directed. The downhole motor 10 must support thrust loads: a downward axial pressure is exerted during the drilling process, and an upward axial pressure is exerted on the motor when the drill string (or coiled tubing) is withdrawn. Thus, the motor 10 is provided with at least one and preferably two thrust bearing assemblies 80 and 82, to be described in more detail hereafter. In addition, the rotation of the drive shaft 44 within the bearing housing 46 is managed by radial bearings 84 and 86.

The various bearings preferably are continuously lubricated by a lubricant stored in a lubricant reservoir 90 in the annular space between the bearing housing 46 and a piston sleeve 92. Lubricant in the reservoir 90 is gradually excreted as a piston 94 gravitates from the upper position, shown in the drawings, to a lower position (not shown). The lubricant travels through the bearing assemblies 80 and 82, around the radial bearings 84 and 86 by a pathway created by a system of grooves and slots, as will be described in more detail hereafter.

Figure 3:
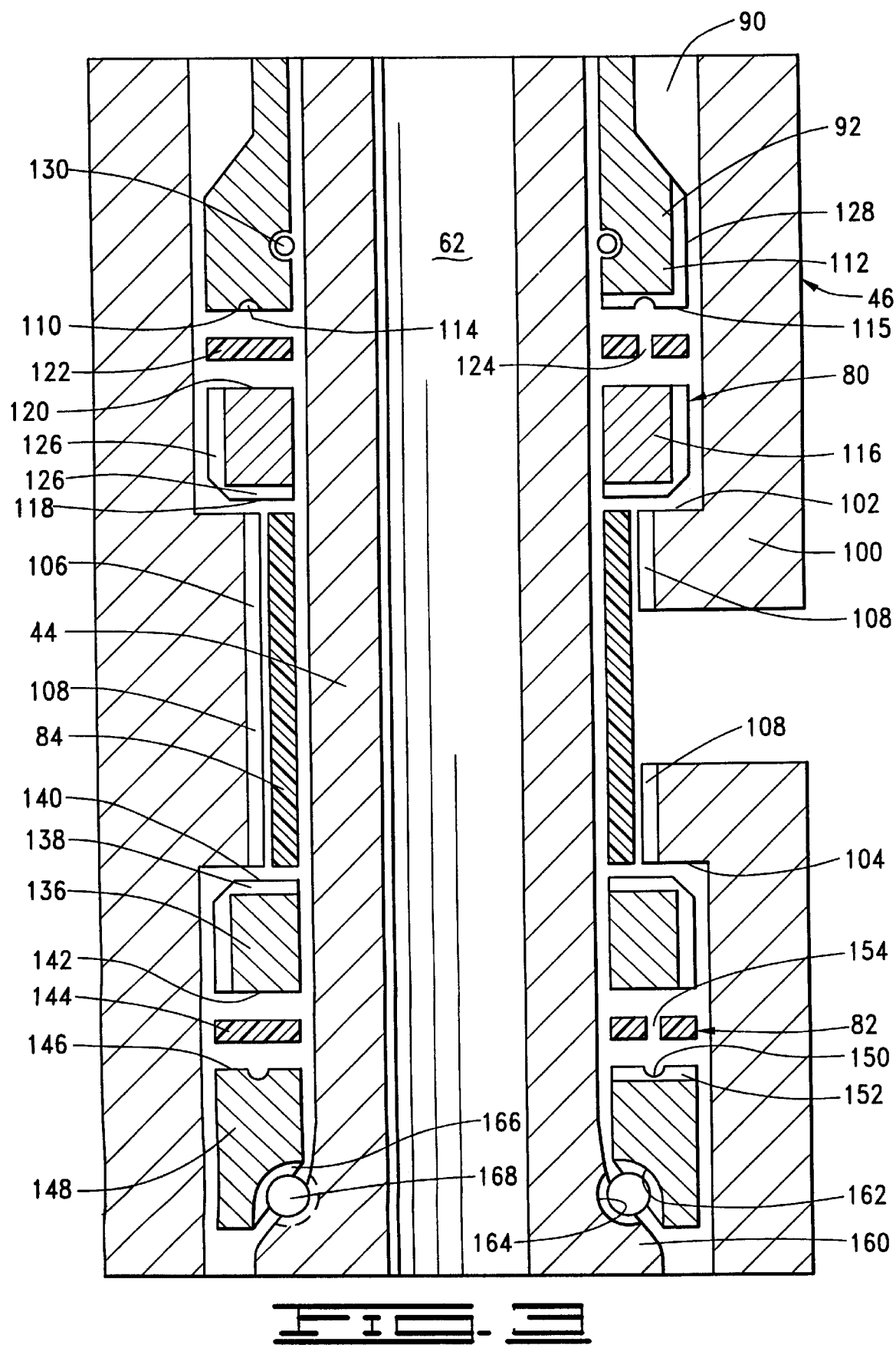
FIG. 3 shows a further enlarged, fragmented sectional view of the thrust bearing assemblies.

The thrust bearing assemblies 80 and 82 are best seen in FIG. 3. The bearing housing 46 is provided with an internal annular section 100 with a smaller internal diameter forming an upper shoulder 102 and a lower shoulder 104. The inner surface 106 of the section 100 is sized to receive the radial bearing 84 and is provided with a lubricant grooves 108.

The first bearing assembly 80 is adapted to transmit axial pressure from the bearing housing 46 to the drive shaft 44. More specifically, the upward axial pressure is transmitted from the shoulder 102 to the annular face 110 on the downhole end 112 of the piston sleeve 92 through the bearing assembly 80. The annular face 110 is provided with a lubricant groove 114 and a slot 115.

The bearing assembly 80 comprises an annular bearing race 116 with a lower face 118 that abuts the shoulder 102. The upper face 120 opposes the annular face 110 of the piston sleeve 92 and contains a self-lubricating thrust washer 122, shown in FIGS. 4 and 5. As used herein, "self-lubricating thrust washer" means a flat annular ring coated with, treated with or formed of an anti-friction material. Preferably, the self-lubricating thrust washer comprises a washer formed of three layers: (1) a steel backing layer; (2)

an inner layer of porous bronze sintered onto the steel backing and impregnated with a homogenous mixture of PTFE (polytetrafluoroethyline) and lead; and (3) a low-friction PTFE-lead overlay. A preferred self-lubricating thrust washer is marketed as DU Thrust Washers by Garlock Bearings, Inc. of Thorofare, N.J.

The thrust washer 122 has a lubricant hole 124 therethrough, and the race 116 is provided with lubricant grooves 126 continuous with the hole 124. A lubricant groove 128 also is formed in the lateral aspect of the end 112 of the piston sleeve 92. In a manner yet to be explained, the piston sleeve 92 preferably is locked to rotate with the drive shaft 44, so a seal such as an O-ring 130 is provided between the two coaxial surfaces.

Thus, it will now be understood that the upward axial force is transmitted from the bearing housing 46 to the shoulder 102 of the annular section 100, thence through the race 116, through the washer 122, to the downhole end 112 of the piston sleeve 92. Returning to FIG. 2A–2B, the piston sleeve 92 transmits the force to the shim retainer 132 and one or more wave spring washers 134 to the downhole end 54 of the connecting rod 34, which is threadle connected to the drive shaft 44.

Referring again to FIG. 3, the second bearing assembly 82 will be described. The second bearing assembly 82 is adapted to transmit downward axial force from the bearing housing 46 to the drive shaft 44. The lower annular shoulder 104 of the annular section 100 of the bearing housing 46 abuts a second bearing race 136 with lubricant grooves 138. The upper face 140 abuts the shoulder 104, and the lower face 142 abuts a second thrust washer 144, similar to the thrust washer 122. The upper surface 146 of a thrust washer retainer 148 opposes the lower surface 142 of the race 136 and thus contains the thrust washer 144. The upper surface 146 of the retainer 148 has a circumferential lubricant groove 150 and a transverse slot 152, which communicate with a lubricant hole 154 through the thrust washer 144.

To receive the axial force, the drive shaft 44 is provided with an annular shoulder 160. The thrust washer retainer 148 is provided with an inner annular tapered section 162 to mate with the shoulder 160. The thrust washer retainer 148 is locked to the drive shaft 44 for rotation therewith in some suitable manner. For example, the shoulder 160 can be provided with one or more recesses 164 (FIG. 11) that oppose recesses 166 in the inner section 162 of the retainer 148. When balls 168 are positioned between the mating recesses 164 and 166, rotational movement between the retainer 148 and the drive shaft 44 is prevented.

With continuing reference to FIG. 3, it can now be seen that downward axial force on the bearing housing 46 is transmitted through the shoulder 104, through the race 136, the thrust washer 144 to the thrust washer retainer 148. The annular section 162 of the thrust washer retainer 148 impacts the shoulder 160 on the drive shaft 44, and thus thrust is imparted to the drill bit or other tool on the end thereof.

It will now also be apparent that the lubricant from the reservoir 90 travels through the first bearing assembly 80, around the radial bearing 84, and through the second bearing assembly 82. Thus, the bearing assemblies are continuously bathed in lubricant while the motor is in use. However, it will be appreciated that the thrust bearing assemblies of this invention are not dependent on lubricant, due to the use of the self-lubricating thrust washers as the bearing elements.

Returning once again to FIG. 2A–2B, a rotary seal assembly 178 is provided between the bearing housing 46 and the drive shaft 44. For a detailed description of the rotary seal assembly 178, reference is made to FIGS. 6–10. The rotary seal assembly of this invention comprises a sinuous seal groove or gland 180, which receives an annular flexible seal, such as a conventional O-ring 182. Depending on the design and intended function of the rotary device, the sinuous groove may be formed on the outer surface of the inner elongate member or the inner surface of the coaxial outer tubular member. In the downhole motor 10, the groove 180 preferably is formed on the inner surface of the bearing housing 46.

In one preferred method of providing the seal 178, an endcap 184 is fabricated for the bearing housing 46. As shown in FIGS. 2B and 6–10, the endcap 184 is a short tubular member with a threaded end 186 for attachment to the bearing housing 46. The outer diameter of the endcap 184 is sized the same as the bearing housing 46 and forms an extension thereof. A seal, such as an O-ring 188, may be provided at the threaded connection between the threaded end 186 and the bearing housing 46. Preferably, the groove 190 for the O-ring 188 is formed in the threaded end 186 (FIG. 6).

The sinuous groove 180 may be formed in any convenient manner. One preferred fabrication technique will be described. First, as shown in FIG. 7, an endcap blank 194 is selected to conform to the bearing housing 46. Next, a circumferential sleeve groove 196 is machined around the blank near one end 198. Also, the inside of the end 198 may be machined out at 200 to conform to the neck 202 (FIG. 11) of the drive shaft 44.

Next, the end 198 of the blank 194 is cut transversely. The cut 204 is made in a wavy, or sinuous, or non-linear pattern, as shown in FIG. 7. A sleeve 206, shown in FIG. 8 is formed to fit in the groove 196 with the edges of the cut 204 spaced apart to form the back of the groove 180. The two sections of the blank 194 are connected by welding the sleeve 206 at each edge 208 and 210, as seen in FIG. 9. Thus, the cut edges of the blank form the groove 180.

Although, the specific shape of the groove 180 is not critical, a preferred shape is illustrated in FIG. 10. As shown, the preferred shape has two diversions 212 and 214 from what would otherwise be a linear groove in this view. However, other shapes and other numbers of diversions could readily be substituted.

The neck 202 of the drive shaft 44 (FIG. 11) preferably is shot-peened, as this will provide a textured surface to be engaged by the O-ring 182 (FIG. 2B). The pits in the shot-peened neck 202 will hold lubricant for the seal 182.

Thus formed, the groove 180 is sized to retain a conventional O-ring 182 and provide a relatively high "squeeze" on the O-ring between the neck 202 of the drive shaft 44 (see also FIG. 11) and the O-ring so as to provide a good fluid seal. However, rotation of the O-ring 182 is prevented by the non-linear shape of the groove 180. It will now be appreciated that this simple seal assembly provides an effective fluid seal using a conventional and inexpensive O-ring.

A second rotary wave seal assembly 216 (FIG. 2A) is provided between the piston 94 and the piston sleeve 92. The seal assembly 216 preferably is formed similar to the seal assembly 178 between the endcap 184 of the bearing housing 46 and the drive shaft 44. To that end, the downhole end of the piston 92 is formed with a wavy groove 217 (FIG. 15) in the same manner as the endcap 184. Similarly, the seal member preferably comprises a conventional O-ring. As the seal assembly 216 is substantially the same as the seal assembly 178, no detailed description is included.

As indicated previously, and referring again to FIG. 2A and 2B, the piston sleeve 92 is locked to the drive shaft 44 for rotation therewith. So also is the piston 94 locked to the bearing housing 46, neither rotating. The present invention provides an improved means for locking one tubular member to another.

FIG. 11 is a sectional view of the drive shaft 44, and FIG. 12 is a sectional view of the piston sleeve 92. At least one and preferably three longitudinal slots 218 are formed on the outer surface of the upper end 52 of the drive shaft 44. Preferably these slots 218 in cross section form an arc of less than 180 degrees, as shown in FIG. 13.

Turning to FIG. 12, at least one and preferably three longitudinal slots 220 are formed in the inner surface of the upper end 222 of the piston sleeve 92. The slots 220 extend to the edge of the end 222 of the piston sleeve 92 and end a distance into the body of the sleeve. Preferably, the slots 220 in cross section form an arc greater than 180 degrees, as shown in FIG. 13.

The slots 218 and 220 are sized to enclose a pin 224 (FIG. 12), as best seen in FIG. 13. Now it will be understood that the pin 224 can be retained in the slots 220 of the piston sleeve 92 during assembly, described below. It will also now be apparent that the pin 224 and slots 218, 220 assembly allows axial, sliding movement of the piston sleeve 92 on the drive shaft 44 but prevents rotational movement therebetween. In addition, the curved shape of the slots minimizes the stress concentrations. Thus, rotational forces are less likely to cause fractures in the slots.

Turning now to FIGS. 14 and 15, the anti-locking pin assembly for the bearing housing 46 and piston 94 will be described. At least one and preferably two longitudinal slots 230 are formed on the inside surface of the upper end 56 of the bearing housing 46. A corresponding slot 232 is formed on the outer surface of the upper end 234 of the piston 94. The slot 232 preferably is greater than 180 degrees, like the slot 220. Similarly, the slot 230 preferably is less than 180 degrees, like the slot 218 on the drive shaft 44. When the slots are aligned, the slot 230 and 232 enclose the pin 236. As illustrated, the length of the slots 230 allows the piston 94 to slide a substantial distance down into the bearing housing to empty the lubricant reservoir 90 (FIG. 2A and 2B) and to permit easy assembly.

With continuing reference to FIGS. 14 and 15, yet another advantageous feature of the rotary device of this invention will be explained. As indicated, the piston 94 gravitates downwardly toward the end 112 of the piston sleeve 92 to gradually excrete the lubricant in the reservoir 90. It is desirable to provide a mechanism for stopping the travel of the piston 94 along the piston sleeve 92 to prevent a frictional contact between the end 240 of the piston 94 and the upper surface 242 of the piston sleeve 94 (FIG. 12). For this purpose, the outer surface of the piston 92 may be provided with a "bump" or chamfer 246 (FIG. 15), and the inner surface of the bearing housing 46 may be provided with a corresponding chamfer 248. Thus, when the piston 94 is loaded during assembly of the motor 10, the chamfer 246 in the piston 94 will engage the chamfer 248 on the inside of the bearing housing 46, and the end 240 of the piston will stop just short of touching the upper surface 242 of the end 112 of the piston sleeve 92.

Returning once again to FIG. 2A–2B, yet another aspect of the present invention will be explained. As described previously, the various thrust and radial bearing assemblies in the bearing section 16 are bathed with lubricant fed from a reservoir 90 as the piston 94 descends. While lubricant is not essential in the bearing section 16, it is likely to maximize performance of the various bearing elements. On occasion, debris from drilling fluid can enter the reservoir from the connecting section 14. The present invention has addressed this problem by providing an anti-friction sleeve 250 between the downhole end 54 of the connecting rod 34 and the downhole end 58 of the universal housing 36. Preferably, the sleeve 250 is a self-lubricating radial bearing formed of fiberglass. Thus, the sleeve 250 forms a barrier between the drilling fluid path 62 and the lubricant reservoir 90 and provides a radial bearing surface as well.

Now that the various parts of the downhole motor 10 have been described, assembly of the motor will be summarized. First, the radial bearing 86 is pressed inside the upper end 198 of the endcap 184. The radial bearings 84 and 250 are likewise pressed into the bearing housing 46 and universal housing 36, respectively. Next, the various O-rings, including the O-rings in the rotary seals 178 and 216, are pressed into their respective seal grooves. The locking pins 224 and 236 are inserted into the longitudinal slots 220 and 232 of the piston sleeve 92 and piston 94, respectively.

The drive shaft 44 is supported while the endcap 184 is place over it. Then, the balls 168 are inserted in the recesses 164 in the shoulder 160 of the drive shaft 44, and the thrust bearing retainer 148 is placed over the drive shaft aligning the recesses 166 with the balls 168. The thrust washer 144 and the bearing race 136 next are placed on the drive shaft 44. Then, the bearing housing 46 is placed over the lower bearing assembly 82 and threadedly connected to the endcap 184.

Next, the upper bearing assembly 80 is assembled. The bearing race 116 and thrust washer 122 are inserted, and then the piston sleeve 92 is loaded. Note that the slots and anti-locking pins in the sleeve 92 must be aligned with the corresponding slots 218 in the drive shaft 44.

Next, the piston 94 is inserted while the slots 232 and anti-locking pins 236 are aligned with the corresponding slots 230 in the bearing housing 46. Then, the shim retainer 132 and the necessary wave springs 134 are inserted. Now the bearing section is complete and ready for connection to the connecting section and the motor section in a conventional manner.

Changes can be made in the combination and arrangement of the various parts and elements described herein without departing from the spirit and scope of the invention as defined in the following claims.

What is claimed is:

1. A downhole motor for use with drilling fluid comprising:
   a motor section comprising:
      a tubular outer assembly; and
      a motor supported in the tubular outer assembly for creating torque;
   a bearing section comprising:
      a bearing housing;
      a drive shaft supported for rotation within the bearing housing and operatively connected to the motor; and
      a thrust bearing assembly sealed from the drilling fluid and adapted to transmit axial pressure between the bearing housing and the drive shaft and including a bearing comprising a self-lubricating thrust washer.

2. The downhole motor of claim 1 further comprising a rotary seal assembly comprising an annular flexible seal member received in a circumferential sinuous groove formed in either the outer surface of the drive shaft or the inner surface of the bearing housing.

3. The downhole motor of claim 1 wherein the thrust bearing assembly comprises a first bearing assembly and a second bearing assembly, wherein the first bearing assembly transmits upward pressure from the bearing housing to the drive shaft and the second bearing assembly transmits downward pressure from the bearing housing to the drive shaft, and wherein each of the first and second bearing assemblies comprises a self-lubricating thrust washer.

4. The downhole motor of claim 3 wherein each of the first and second bearing assemblies comprises an annular bearing race, wherein the housing defines an annular shoulder for abutting the race, wherein the motor further comprises an annular face opposing the annular shoulder of the housing for transmitting force to the drive shaft, and wherein the thrust washer is between the bearing race and the annular face.

5. The downhole motor of claim 3 further comprising:
   a connecting section comprising:
      a connecting rod for transmitting torque from the motor to the drive shaft; and
      a universal housing for supporting the connecting rod;
   wherein the motor section, the bearing section and connecting section form a continuous fluid pathway for drilling fluid; and
   an anti-friction sleeve positioned coaxially between the connecting rod and the universal housing whereby debris in the drilling fluid is prevented from entering the bearing section.

6. The downhole motor of claim 5 further comprising a rotary seal assembly comprising an annular flexible seal member received in a circumferential sinuous groove formed in either the outer surface of the drive shaft or the inner surface of the bearing housing.

7. The downhole motor of claim 6 further comprising a lubricant assembly including a piston sleeve positioned coaxially around the drive shaft, a lubricant reservoir defined at least in part by an annular space between the piston sleeve and the bearing housing, and a piston disposed to move axially down the piston sleeve to squeeze lubricant out of the reservoir, wherein the motor further comprises a first anti-rotation assembly including:
   an elongate cylindrical pin;
   a longitudinal slot on the outer wall of the piston; and
   a longitudinal slot on the inner wall of the bearing housing sized and positioned to mate with the longitudinal slot on the outer wall of the piston to enclose the pin, whereby rotation of the piston relative to the bearing housing is prevented and whereby axial movement of the piston relative to the bearing housing is permitted.

8. The downhole motor of claim 7 comprising a second anti-rotation assembly including:
   an elongate cylindrical pin;
   a longitudinal slot on the outer wall of the drive shaft; and
   a longitudinal slot on the inner wall of the piston sleeve sized and positioned to mate with the longitudinal slot on the outer wall of the drive shaft to enclose the pin, whereby rotation of the piston sleeve relative to the drive shaft is prevented and whereby axial movement of the piston sleeve relative to the drive shaft is permitted.

9. The downhole motor of claim 1 further comprising a connecting section including a connecting rod for transmitting torque from the motor to the drive shaft and a universal housing for supporting the connecting rod; wherein the motor section, the bearing section and the connecting section form a continuous fluid pathway for drilling fluid; and wherein the motor further comprises an anti-friction sleeve positioned coaxially between the connecting rod and the universal housing whereby debris in the drilling fluid is prevented from entering the bearing section.

10. The downhole motor of claim 9 further comprising a lubricant assembly including a piston sleeve positioned coaxially around the drive shaft, a lubricant reservoir defined at least in part by an annular space between the piston sleeve and the bearing housing, and a piston disposed to move axially down the piston sleeve to squeeze lubricant out of the reservoir, wherein the motor further comprises a first anti-rotation assembly including:
   an elongate cylindrical pin;
   a longitudinal slot on the outer wall of the drive shaft; and
   a longitudinal slot on the inner wall of the piston sleeve sized and positioned to mate with the longitudinal slot on the outer wall of the drive shaft to enclose the pin, whereby rotation of the piston sleeve relative to the drive shaft is prevented and whereby axial movement of the piston sleeve relative to the drive shaft is permitted.

11. The downhole motor of claim 9 further comprising a lubricant assembly including a piston sleeve positioned coaxially around the drive shaft, a lubricant reservoir defined at least in part by an annular space between the piston sleeve and the bearing housing, and a piston disposed to move axially down the piston sleeve to squeeze lubricant out of the reservoir, wherein the motor further comprises a first anti-rotation assembly including:
   an elongate cylindrical pin;
   a longitudinal slot on the outer wall of the piston; and
   a longitudinal slot on the inner wall of the bearing housing sized and positioned to mate with the longitudinal slot on the outer wall of the piston to enclose the pin, whereby rotation of the piston relative to the bearing housing is prevented and whereby axial movement of the piston relative to the bearing housing is permitted.

12. The downhole motor of claim 9 further comprising a rotary seal assembly comprising an annular flexible seal member received in a circumferential sinuous groove formed in either the outer surface of the drive shaft or the inner surface of the bearing housing.

13. The downhole motor of claim 12 further comprising a lubricant assembly including a piston sleeve positioned coaxially around the drive shaft, a lubricant reservoir defined at least in part by an annular space between the piston sleeve and the bearing housing, and a piston disposed to move axially down the piston sleeve to squeeze lubricant out of the reservoir, wherein the motor further comprises a first anti-rotation assembly including:
   an elongate cylindrical pin;
   a longitudinal slot on the outer wall of the piston; and
   a longitudinal slot on the inner wall of the bearing housing sized and positioned to mate with the longitudinal slot on the outer wall of the piston to enclose the pin, whereby rotation of the piston relative to the bearing housing is prevented and whereby axial movement of the piston relative to the bearing housing is permitted.

14. The downhole motor of claim 13 comprising a second anti-rotation assembly including:
   an elongate cylindrical pin;
   a longitudinal slot on the outer wall of the drive shaft; and
   a longitudinal slot on the inner wall of the piston sleeve sized and positioned to mate with the longitudinal slot on the outer wall of the drive shaft to enclose the pin, whereby rotation of the piston sleeve relative to the drive shaft is prevented and whereby axial movement of the piston sleeve relative to the drive shaft is permitted.

15. The downhole motor of claim 13 further comprising a lubricant assembly including a piston sleeve positioned coaxially around the drive shaft, a lubricant reservoir defined at least in part by an annular space between the piston sleeve and the bearing housing, and a piston disposed to move axially down the piston sleeve to squeeze lubricant out of the reservoir, wherein the motor further comprises a first anti-rotation assembly including:

an elongate cylindrical pin;

a longitudinal slot on the outer wall of the drive shaft; and a longitudinal slot on the inner wall of the piston sleeve sized and positioned to mate with the longitudinal slot on the outer wall of the drive shaft to enclose the pin, whereby rotation of the piston sleeve relative to the drive shaft is prevented and whereby axial movement of the piston sleeve relative to the drive shaft is permitted.

16. The downhole motor of claim 1 further comprising a lubricant assembly including a piston sleeve positioned coaxially around the drive shaft, a lubricant reservoir defined at least in part by an annular space between the piston sleeve and the bearing housing, and a piston disposed to move axially down the piston sleeve to squeeze lubricant out of the reservoir, wherein the motor further comprises a first anti-rotation assembly including:

an elongate cylindrical pin;

a longitudinal slot on the outer wall of the piston; and a longitudinal slot on the inner wall of the bearing housing sized and positioned to mate with the longitudinal slot on the outer wall of the piston to enclose the pin, whereby rotation of the piston relative to the bearing housing is prevented and whereby axial movement of the piston relative to the bearing housing is permitted.

17. The downhole motor of claim 16 further comprising a rotary seal assembly comprising an annular flexible seal member received in a circumferential sinuous groove formed in either the outer surface of the drive shaft or the inner surface of the bearing housing.

18. The downhole motor of claim 16 comprising a second anti-rotation assembly including:

an elongate cylindrical pin;

a longitudinal slot on the outer wall of the drive shaft; and a longitudinal slot on the inner wall of the piston sleeve sized and positioned to mate with the longitudinal slot on the outer wall of the drive shaft to enclose the pin, whereby rotation of the piston sleeve relative to the drive shaft is prevented and whereby axial movement of the piston sleeve relative to the drive shaft is permitted.

19. The downhole motor of claim 18 further comprising a rotary seal assembly comprising an annular flexible seal member received in a circumferential sinuous groove formed in either the outer surface of the drive shaft or the inner surface of the bearing housing.

20. The downhole motor of claim 1 further comprising a lubricant assembly including a piston sleeve positioned coaxially around the drive shaft, a lubricant reservoir defined at least in part by an annular space between the piston sleeve and the bearing housing, and a piston disposed to move axially down the piston sleeve to squeeze lubricant out of the reservoir, wherein the motor further comprises a first anti-rotation assembly including:

an elongate cylindrical pin;

a longitudinal slot on the outer wall of the drive shaft; and a longitudinal slot on the inner wall of the piston sleeve sized and positioned to mate with the longitudinal slot on the outer wall of the drive shaft to enclose the pin, whereby rotation of the piston sleeve relative to the drive shaft is prevented and whereby axial movement of the piston sleeve relative to the drive shaft is permitted.

21. The downhole motor of claim 20 further comprising a rotary seal assembly comprising an annular flexible seal member received in a circumferential sinuous groove formed in either the outer surface of the drive shaft or the inner surface of the bearing housing.

22. A downhole motor for use with drilling fluid comprising:

a motor section comprising:
a tubular outer assembly; and
a motor supported in the tubular outer assembly for creating torque;

a bearing section comprising:
a bearing housing;
a drive shaft supported for rotation within the bearing housing; and
at least one thrust bearing assembly sealed from the drilling fluid for transmitting axial pressure from the bearing housing to the drive shaft; and a connecting section comprising:
a connecting rod for transmitting torque from the motor to the drive shaft; and
a universal housing for supporting the connecting rod;

wherein the motor section, the bearing section and connecting section form a continuous fluid pathway for drilling fluid; and an anti-friction sleeve positioned coaxially between the connecting rod and the universal housing whereby debris in the drilling fluid is prevented from entering the bearing section.

23. The downhole motor of claim 22 further comprising a lubricant assembly including a piston sleeve positioned coaxially around the drive shaft, a lubricant reservoir defined at least in part by an annular space between the piston sleeve and the bearing housing, and a piston disposed to move axially down the piston sleeve to squeeze lubricant out of the reservoir, wherein the motor further comprises a first anti-rotation assembly including:

an elongate cylindrical pin;

a longitudinal slot on the outer wall of the drive shaft; and a longitudinal slot on the inner wall of the piston sleeve sized and positioned to mate with the longitudinal slot on the outer wall of the drive shaft to enclose the pin, whereby rotation of the piston sleeve relative to the drive shaft is prevented and whereby axial movement of the piston sleeve relative to the drive shaft is permitted.

24. The downhole motor of claim 22 further comprising a lubricant assembly including a piston sleeve positioned coaxially a round the drive shaft, a lubricant reservoir defined at least in part by an annular space between the piston sleeve and the bearing housing, and a piston disposed to move axially down the piston sleeve to squeeze lubricant out of the reservoir, wherein the motor further comprises a first anti-rotation assembly including:

an elongate cylindrical pin;

a longitudinal slot on the outer wall of the drive shaft; and a longitudinal slot on the inner wall of the piston sleeve sized and positioned to mate with the longitudinal slot on the outer wall of the drive shaft to enclose the pin, whereby rotation of the piston sleeve relative to the drive shaft is prevented and whereby axial movement of the piston sleeve relative to the drive shaft is permitted.

25. The downhole motor of claim 22 further comprising a rotary seal assembly comprising an annular flexible seal member received in a circumferential sinuous groove formed in either the outer surface of the drive shaft or the inner surface of the bearing housing.

26. The downhole motor of claim 25 further comprising a lubricant assembly including a piston sleeve positioned coaxially around the drive shaft, a lubricant reservoir defined at least in part by an annular space between the piston sleeve and the bearing housing, and a piston disposed to move axially down the piston sleeve to squeeze lubricant out of the reservoir, wherein the motor further comprises a first anti-rotation assembly including:

an elongate cylindrical pin;

a longitudinal slot on the outer wall of the piston; and a longitudinal slot on the inner wall of the bearing housing sized and positioned to mate with the longitudinal slot on the outer wall of the piston to enclose the pin, whereby rotation of the piston relative to the bearing housing is prevented and whereby axial movement of the piston relative to the bearing housing is permitted.

27. The downhole motor of claim 26 comprising a second anti-rotation assembly including:

an elongate cylindrical pin;

a longitudinal slot on the outer wall of the drive shaft; and a longitudinal slot on the inner wall of the piston sleeve sized and positioned to mate with the longitudinal slot on the outer wall of the drive shaft to enclose the pin, whereby rotation of the piston sleeve relative to the drive shaft is prevented and whereby axial movement of the piston sleeve relative to the drive shaft is permitted.

28. The downhole motor of claim 22 further comprising a lubricant assembly including a piston sleeve positioned coaxially around the drive shaft, a lubricant reservoir defined at least in part by an annular space between the piston sleeve and the bearing housing, and a piston disposed to move axially down the piston sleeve to squeeze lubricant out of the reservoir, wherein the motor further comprises a first anti-rotation assembly including:

an elongate cylindrical pin;

a longitudinal slot on the outer wall of the piston; and a longitudinal slot on the inner wall of the bearing housing sized and positioned to mate with the longitudinal slot on the outer wall of the piston to enclose the pin, whereby rotation of the piston relative to the bearing housing is prevented and whereby axial movement of the piston relative to the bearing housing is permitted.

29. The downhole motor of claim 28 comprising a second anti-rotation assembly including:

an elongate cylindrical pin;

a longitudinal slot on the outer wall of the drive shaft; and a longitudinal slot on the inner wall of the piston sleeve sized and positioned to mate with the longitudinal slot on the outer wall of the drive shaft to enclose the pin, whereby rotation of the piston sleeve relative to the drive shaft is prevented and whereby axial movement of the piston sleeve relative to the drive shaft is permitted.

* * * * *